UNITED STATES PATENT OFFICE.

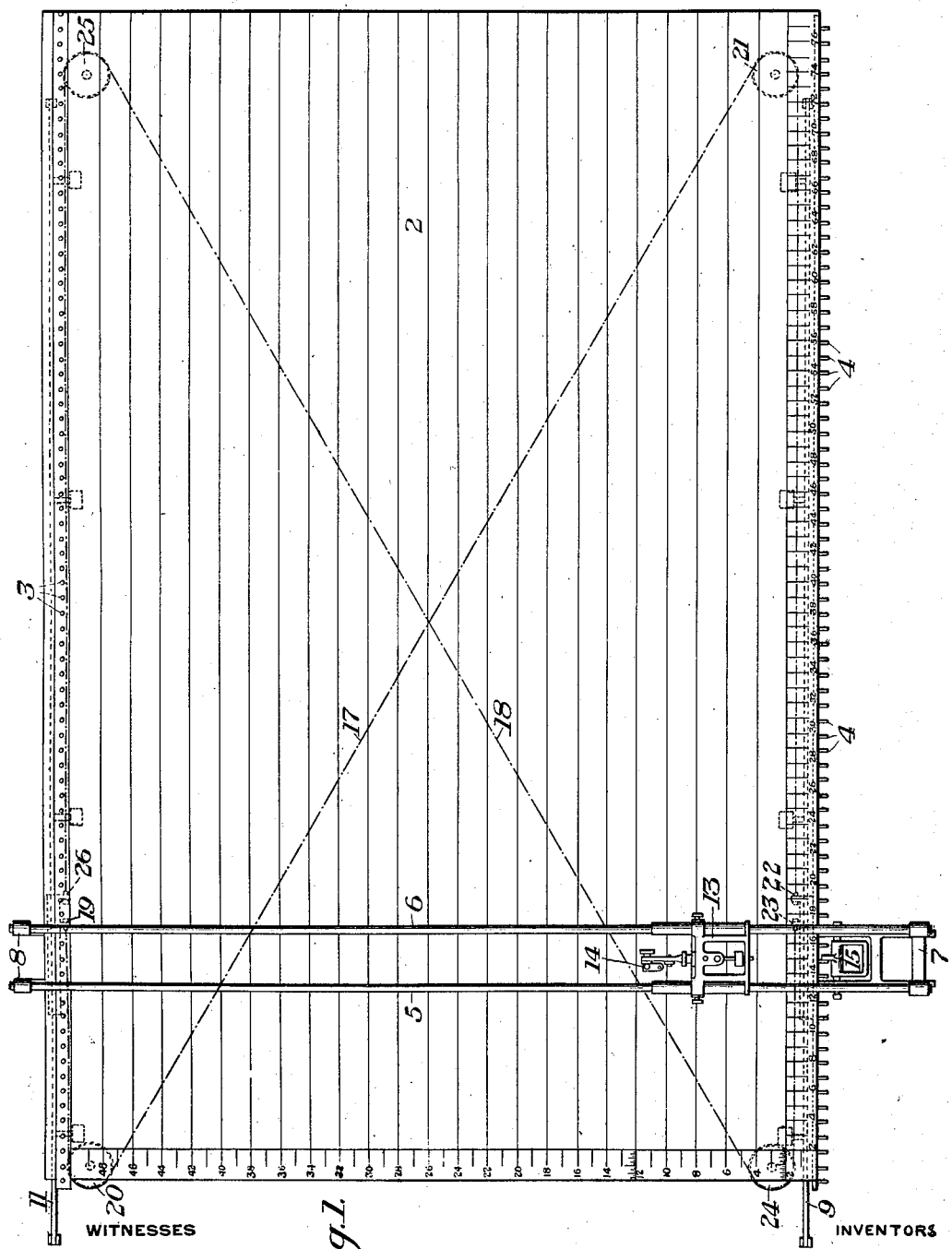

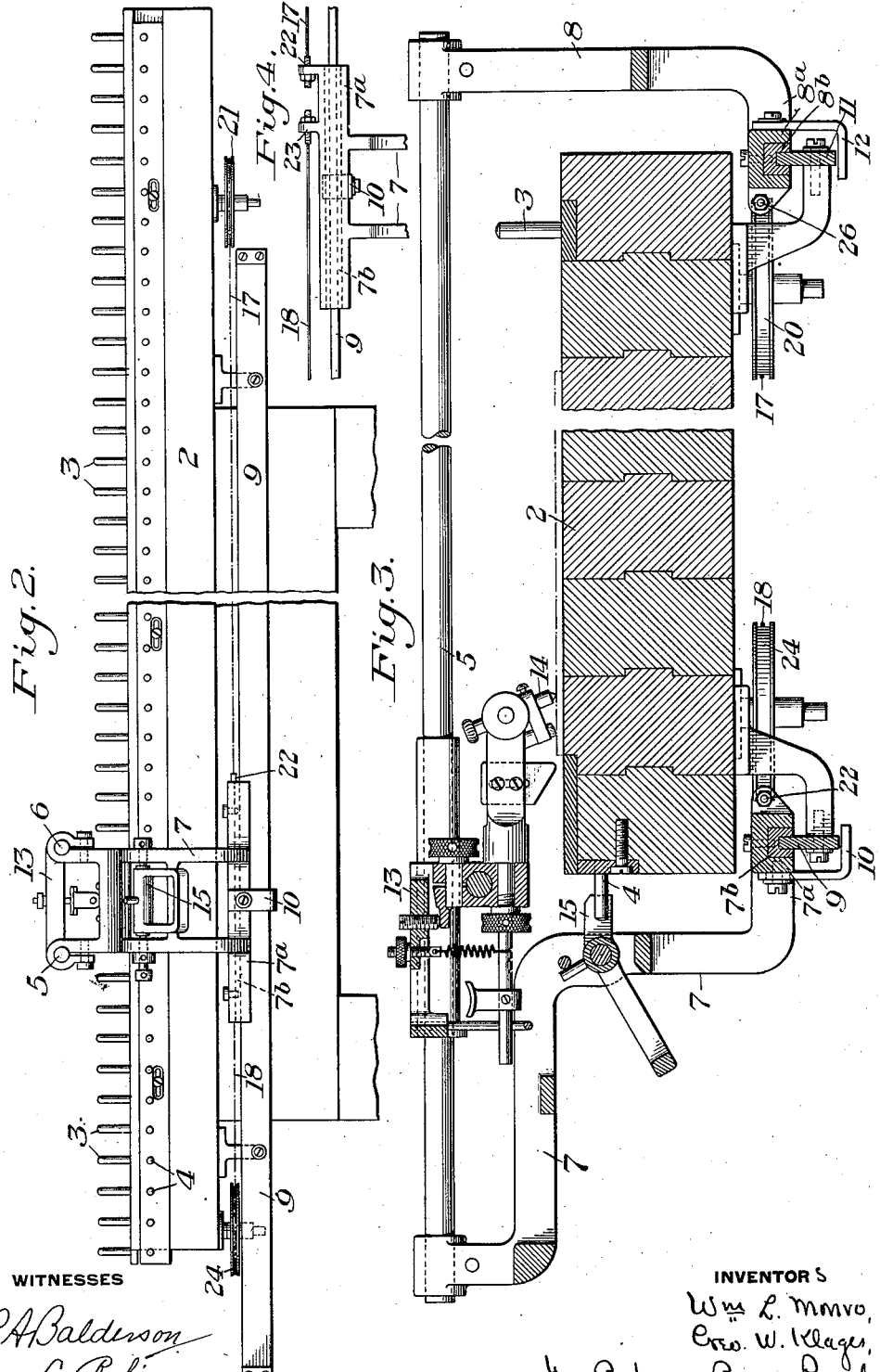

WILLIAM L. MONRO AND GEORGE W. KLAGES, OF PITTSBURGH, PENNSYLVANIA, ASSIGNORS TO WINDOW GLASS MACHINE COMPANY, OF PITTSBURGH, PENNSYLVANIA, A CORPORATION OF NEW JERSEY.

GLASS-CUTTING APPARATUS.

1,178,534.  Specification of Letters Patent.  Patented Apr. 11, 1916.

Application filed July 2, 1914. Serial No. 848,566.

*To all whom it may concern:*

Be it known that we, WILLIAM L. MONRO and GEORGE W. KLAGES, both citizens of the United States, and residents of Pittsburgh, Allegheny county, Pennsylvania, have invented a new and useful Improvement in Glass-Cutting Apparatus, of which the following is a full, clear, and exact description, reference being had to the accompanying drawings, forming part of this specification, in which—

Figure 1 is a plan view of a glass cutting table and cutting apparatus embodying our invention. Fig. 2 is a side elevation of the same. Fig. 3 is a transverse vertical section, and Fig. 4 is a detail view.

Our invention has relation to glass cutting apparatus, and is designed to provide means of simple and efficient character which can be readily used in connection with a glass cutting table for the accurate cutting of plates or sheets of glass.

Our invention may be made in the nature of an attachment which can be applied to the usual glass cutting tables, in place of the cutting rule ordinarily employed.

The nature of our invention will be best understood by reference to the accompanying drawings, in which we have shown the preferred embodiment thereof, and which will now be described, it being premised, however, that various changes can be made in the details of construction and arrangement of the several parts without departing from the spirit and scope of our invention.

In these drawings the numeral 2 designates a glass cutting table which may be of the usual construction having a series of pins 3 at one of its longitudinal edges which are usually provided for engagement with one end of the usual cutting rule; and a series of laterally projecting pins 4 at the opposite edge for engagement with the other end portion of said rule. In the operation of the table with our attachment applied thereto, the pins 3 are not used, but may be retained to permit the table to be operated in the usual manner, if desired.

5 and 6 designate two parallel rods which are supported transversely of the table upon the movable brackets 7 and 8. The bracket 7 is at one side of the table and is provided at its lower end with an inwardly extending arm 7$^a$ having a shoe portion 7$^b$ adapted to slide on a track bar 9. Preferably, the shoe 7$^b$ is formed by a separate insert, as shown in Fig. 3. The bracket 7 is also preferably provided with a guard arm 10 which extends underneath the track bar 9 and prevents disengagement of the shoe 7$^b$ with said bar. The bracket 8 is at the opposite side of the table and has the inwardly bent arm 8$^a$ carrying the shoe portion 8$^b$ which engages a track bar 11, similar to the bar 9.

12 is a guard member which is similar to the guard member 10 at the opposite side.

13 designates a cutter carriage which is sleeved upon, and mounted to move transversely of the table on the parallel rods 5 and 6. This carriage carries a cutting tool 14 of any suitable character. The details of the cutter carriage and cutter form no part of the present invention, and need not be described in detail, as any suitable arrangement of carriage and cutter may be employed. The carriage and cutter herein shown form the subject matter of the pending application of John Waterloo and George W. Klages, Serial No. 842,437, filed June 2, 1914.

The brackets 7 and 8, together with the guide rods, can be moved longitudinally of the table 2 to any desired position, and may be locked in the set position by any suitable means. In the drawing this lock is shown as consisting of a lever catch 15 pivoted to the bracket 7 and adapted to engage between any two of the lateral pins 4, or to impinge against any one of said pins, at one edge of the table. As shown, the catch 15 is designed to be held in engaging position by hand.

It is desirable that the apparatus shall be so constructed and arranged as to be capable of very accurate work. It may happen, especially after some wear, and as the rods 5 and 6 are of considerable length, that in moving the brackets 7 and 8 along the table one of the brackets would move slightly more than the other, so that the rods 5 and 6 would not be strictly perpendicular to the longitudinal axis of the table. To guard against this possibility, we preferably employ a guide or equalizing device which will insure a constant perpendicularity of the guide rods 5 and 6 with respect to the longitudinal axis of the table. This guide or equalizing device may conveniently consist of two wires 17 and 18. The wire 17 is connected at one end to the bracket 8 at the point 19 and extends thence forwardly around a sheave or pulley 20, thence obliquely backward across the table around a similar sheave or pulley 21 to the diagonally opposite corner portion of the table, and thence forwardly where it is connected to the bracket 7 at the point 22. The wire 18 is attached to the bracket 7 at the point 23, extending thence forwardly around a sheave or pulley 24, thence diagonally across the table to the rear end thereof and around a sheave or pulley 25, and thence forwardly to the bracket 8 to which it is connected at 26. These wires are preferably of material which will have a minimum amount of stretch, such as piano wire. It will be readily seen that when these equalizing wires are properly applied they will insure a true parallel movement of the brackets, thus insuring the proper positioning at all times of the cutter carriage carrying rods 5 and 6.

The advantages of our invention will be apparent, since it provides a very simple form of attachment by means of which glass sheets of various sizes and lengths can be readily and accurately cut upon the ordinary table, the attachment taking the place of the old cutting rule. These cutting rules require to be lifted manually from one position to another, whereas the present attachment can be readily slid from one position to another by temporarily releasing the lever catch 15.

When it is desired to use the table with a cutting rule in the ordinary manner the attachment can be readily removed, or moved, to a position where it is entirely out of the way and will not in any way interfere with the use of the table in the ordinary way. By setting the cutter longitudinally of the table instead of transversely, sheets may be cut longitudinally by simply moving the bridge lengthwise of the table and causing the cutter to operate during such movement.

What we claim is:

1. The combination with a glass cutting table, of a bridge mounted to span the table in one direction and to be moved over the table in a direction at substantially right angles to its span, guides supported by the table and on which said bridge is mounted, said guides being separated from the edges of the table, a holding device carried by the bridge, means on the table to coöperate with the holding device, and a glass-cutter movably mounted for travel on the bridge; substantially as described.

2. The combination with a glass cutting table, of a bridge mounted to traverse said table in one direction, a cutter carriage mounted on the bridge to traverse the table in a direction at substantially right angles to the movement of the bridge itself, and an equalizer connected to the bridge to secure parallel movement thereof, substantially as described.

3. The combination with a glass cutting table having one horizontal dimension greater than the other and having a plurality of stops, of a cutter guide mounted to traverse said table longitudinally thereof and having means for coöperating with the different stops, the table having tracks located below its top and upon which the said guide is mounted; substantially as described.

4. The combination with a glass cutting table, of a bridge spanning the table in one direction and movable over the table surface in a direction at substantially right angles to that in which the bridge extends, and having end portions which extend to points below the level of the surface of the table, tracks engaged by said end portions, a cutter-carriage mounted to travel on the bridge, a cutter on said carriage, and equalizing means connected to said end portions of the bridge below the level of the surface of the table for insuring parallel movement of the bridge; substantially as described.

5. The combination with a glass cutting table, of a bridge mounted to span the table in one direction and having end supports which extend downwardly below the table top, guides fixed relatively to the table and upon which the end supports are movably mounted, and a cutter arranged to travel on said bridge; substantially as described.

6. The combination with a glass cutting table, of a bridge mounted to span the table in one direction and having end supports which extend downwardly below the table top, guides fixed relatively to the table and upon which the end supports are movably mounted, and a cutter arranged to travel on said bridge, together with equalizing means for insuring a parallel movement of the bridge; substantially as described.

7. The combination with a glass cutting table, of a pair of parallel guides mounted to span the table in one direction, a cutter carriage mounted for movement on said guides, movable supports whereby the guides may be moved along the table in a direction at right angles to the lengthwise direction of the guides, means whereby the guides may be held in their different adjusted positions, and means for insuring a parallel movement of said guides; substantially as described.

In testimony whereof, we have hereunto set our hands.

WILLIAM L. MONRO.
GEORGE W. KLAGES.

Witnesses:
ALICE A. TULL,
GEO. H. PARMELEE.